US010227265B2

(12) United States Patent
Soons et al.

(10) Patent No.: US 10,227,265 B2
(45) Date of Patent: Mar. 12, 2019

(54) GRANULATION OF UREA PRODUCTS

(71) Applicant: STAMICARBON B.V., Sittard (NL)

(72) Inventors: Petrus Catharina Gerlach Soons, Sittard (NL); Stefan H. Schaafsma, Sittard (NL)

(73) Assignee: STAMICARBON B.V., Sittard (NL)

( * ) Notice: Subject to any disclaimer, the term of this patent is extended or adjusted under 35 U.S.C. 154(b) by 0 days.

(21) Appl. No.: 15/742,488

(22) PCT Filed: Jul. 6, 2016

(86) PCT No.: PCT/NL2016/050486
§ 371 (c)(1),
(2) Date: Jan. 5, 2018

(87) PCT Pub. No.: WO2017/007315
PCT Pub. Date: Jan. 12, 2017

(65) Prior Publication Data
US 2018/0201551 A1 Jul. 19, 2018

(30) Foreign Application Priority Data

Jul. 6, 2015 (EP) .................... 15175476

(51) Int. Cl.
*C05C 9/00* (2006.01)
*C05C 3/00* (2006.01)
(Continued)

(52) U.S. Cl.
CPC .............. *C05G 3/0058* (2013.01); *B01J 2/16* (2013.01); *C05C 3/00* (2013.01); *C05C 3/005* (2013.01); *C05C 9/00* (2013.01); *C05C 9/005* (2013.01)

(58) Field of Classification Search
None
See application file for complete search history.

(56) References Cited

U.S. PATENT DOCUMENTS 3,362,809 A * 1/1968 Tucker ................ B01J 2/12
422/209
3,725,029 A 4/1973 Blackmore
(Continued)

FOREIGN PATENT DOCUMENTS

| EA | 2 431 346 | 3/2012 |
| EP | 0 289 074 | 11/1988 |
| EP | 2 489 429 | 8/2012 |

OTHER PUBLICATIONS

International Search Report and Written Opinion for PCT/NL2016/050486, dated Oct. 25, 2016, 10 pages.

*Primary Examiner* — Wayne A Langel
(74) *Attorney, Agent, or Firm* — Morrison & Foerster LLP

(57) ABSTRACT

Disclosed is a method of making a granulate of a urea product comprising urea and a salt, such as urea ammonium sulfate, having a high content of the salt. The high content is such as to provide an amount of the salt above the limit of solubility of the salt in urea. The granulate of the invention is characterized by having a smooth surface, which, e.g. in the event of urea ammonium sulfate, is not normally the case for granulate having the aforementioned high ammonium sulfate content. According to the invention this is realized by dividing the feed liquids to granulation. This division is based on non-final granulation liquids of a sufficiently high content of the salt, and a final granulation liquid (determining the surface) having a salt content of below the solubility limit of the salt, or no salt at all. E.g. in the event of urea ammonium sulfate, the non-final granulation liquids possibly are a slurry of urea and more than 20 wt. % of ammonium sulfate. The final granulation liquid then has 0-20 wt. % of ammonium sulfate, i.e. below the solubility limit.

13 Claims, 1 Drawing Sheet

(51) Int. Cl.
*C05G 3/00* (2006.01)
*B01J 2/16* (2006.01)

(56) References Cited

U.S. PATENT DOCUMENTS

| | | | |
|---|---|---|---|
| 3,785,796 A | | 1/1974 | Mann, Jr. |
| 4,500,336 A | * | 2/1985 | Van Hijfte ............ C07C 273/02 427/182 |
| 5,120,345 A | * | 6/1992 | Kayaert ................... B01J 2/16 71/30 |
| 6,179,893 B1 | * | 1/2001 | Bendix ................... C05C 3/00 71/28 |
| 2013/0319060 A1 | * | 12/2013 | Niehues .................. C05C 9/00 71/28 |

* cited by examiner

GRANULATION OF UREA PRODUCTS

CROSS-REFERENCE TO RELATED APPLICATIONS

This application is the national phase of PCT application PCT/NL2016/050486 having an international filing date of 6 Jul. 2016, which claims benefit of European patent application No. 15175476.9 filed 6 Jul. 2015. The contents of the above patent applications are incorporated by reference herein in their entirety.

FIELD OF THE INVENTION

The invention relates to a method for the production of granules of urea products comprising an insoluble amount of a salt, such as ammonium sulfate (AS) or potassium chloride. The invention particularly pertains to granules of urea ammonium sulfate (UAS).

BACKGROUND OF THE INVENTION

Urea products are products comprising urea and, preferably, also another component generally suitable for fertilizing purposes. Besides the known primary macro-nutrients phosphor and potassium, such components are, e.g., ammonium sulfate, ammonium nitrate, potassium chloride, or other salts based on sulfur, calcium salts, magnesium salts, zinc-salts (e.g. zinc oxide, zinc sulphate) and further salts of B, Cu, Fe, Cl, Mn, Mo.

This is reflected in the widespread existence of fertilizers that contain several of these nutrients, e.g. nitrogen and sulfur, in the same product. One such product is urea ammonium sulfate (UAS). An important advantage of UAS is that it can be produced in solid form. This facilitates the transportation of this fertilizer product over long distances, as well as its distribution over the land.

Urea granules are typically produced in a fluid bed granulator, wherein particles are kept in motion by an air stream. Onto these particles liquid urea is sprayed, in the form of droplets or as a film, thereby causing particle growth. The resulting granulate has excellent strength allowing it to be transported by ship or over land over large distances.

Ammonium sulfate is a salt which is generally produced by reacting ammonia with sulfuric acid. The resulting solution is concentrated and converted into solid particles or a slurry. Ammonium sulfate (AS) is soluble in urea (such as a urea melt) up to a concentration of about 20% and then forms a solution, i.e., a homogeneous liquid. This homogeneous liquid can be processed in a fluid bed granulator in essentially the same way as a standard urea solution.

A background reference relating to such a granulation process is US2013/0319060. Herein a method is disclosed for recycling ammonium salts, obtained from a scrubbing system for the removal of ammonia from the off-gas of a urea granulator, by mixing these salts homogeneously in the urea granulator. Both UAS (a urea/ammonium salt stream) and a urea solution are added to a granulator. Thereby the amount of UAS is the highest in the first compartment of the granulator, and decreased in downstream direction along the axis of the granulator. The highest amount of the urea solution is sprayed into the granulator at the granule flow outlet side, and the amount of urea solution is decreased in upstream direction along the axis of the granulator. The amount of ammonia salt is lower than 20% by weight. The method is disclosed to have the advantage that the moisture uptake of the resulting urea ammonium salt granules is similar to the moisture uptake of urea granulate.

It will be understood that the total content of ammonium sulfate in the granules produced according to the disclosed method, will be well below 20% by weight. In fact, the resulting product is disclosed to satisfy the specifications for urea. In practice, however, it is also desired to produce UAS having a substantially higher content of ammonium sulfate, particularly of over 20% by weight. This implies that UAS is to be produced wherein the concentration of ammonia sulfate would exceed the maximum soluble concentration. The production of UAS granules having such high concentrations of AS, typically greater than 20% by weight, is technically challenging due to, inter alia, a significant generation of dust.

Such a higher fraction of dust is released from the granules during many of the processing steps occurring in the granulation process (e.g. fluidization in fluidized bed granulator, fluidization in the granulate cooler, conveying, screening, etc.). All dust released in these processing steps is either entrained with the fluidization air (in granulator and/or in granulate cooler and/or in final product cooler) or entrained via a central dust removal system (vacuum cleaning) and washed out via a dust-washer. The wash water in which the UAS-dust particles readily dissolve consists of a solution of urea and ammonium sulfate in water and needs to be evaporated for further processing. All this is leading to an increase of the amount of UAS-solution that needs to be reworked, leading to higher capital and operational costs.

When UAS granulate with high AS-content is produced, the dust for the major part consists of Ammonium Sulfate, which puts extra constraints and demands to the rework/recycle of it. In general dust is scrubbed leading to a diluted UAS aqueous stream. The stream is reworked by concentrating in one or more evaporators. As it is desirable to process a homogeneous melt stream rather than a slurry stream, extra measures have to be taken to prevent that the solubility of ammonium sulfate in urea will be exceeded in these cases.

The increased dust-release/increased dust-content of the product will also lead to an increased tendency for fouling/scaling product build up at the inner walls of all process-equipment in the granulation process. This fouling will lead to an increased risk of choking/blocking and hence an increased necessity of cleaning, etc. This will lead to an increase of down time of the granulation plant.

During handling and processing steps downstream the granulation plant, the presence of dust will lead to various commonly known consequences such as caking, dusting, quality issues, piling, loss of product etc.

It is thus desired to provide a process enabling the production of UAS granules that is capable of producing UAS comprising an insoluble amount of ammonium sulfate, whereby one or more of the aforementioned problems are alleviated or eliminated.

Similar consideration apply to producing granules of other urea products, comprising one or more additives, such as a salt, in a proportion exceeding the solubility limit thereof.

SUMMARY OF THE INVENTION

In order to better address the foregoing desires, the invention provides a method for producing granules of a urea product comprising urea and at least one salt, the method comprising providing a slurry comprising urea and, relative to the urea, an amount of the salt exceeding the solubility limit of the salt in the urea; subjecting said slurry to a fluidized bed granulation process, thereby forming a Urea Product Granulate Intermediate; providing a liquid comprising urea and, optionally, a salt in an amount below the solubility limit of the salt in the urea, said salt being dissolved in the urea; presenting said liquid as a final granulation liquid to the Urea Product Granulate Intermediate, thereby obtaining a granulate of the urea product.

Particularly, the invention provides a method for producing UAS granules, the method comprising providing a slurry comprising urea and, relative to the urea, more than 20 wt. % of ammonium sulfate; subjecting said slurry to a fluidized bed granulation process, thereby forming a UAS granulate intermediate; providing a liquid comprising urea and, relative to the urea, an amount of 0 wt. % to 20 wt. % of ammonium sulfate, said ammonium sulfate being dissolved in the urea; presenting said liquid as a final granulation liquid to the UAS granulate intermediate, thereby obtaining a urea ammonium sulfate granulate having more than 20% by weight of ammonium sulfate.

In yet another aspect, the invention presents a urea product granulate obtainable by the method according to any one of the preceding claims. Particularly, in a further aspect, the invention concerns a urea ammonium sulfate granulate obtainable by the method identified in the preceding paragraph, said granulate comprising granules having more than 20% by weight of ammonium sulfate, and having a skin corresponding to a weight fraction of from 3 wt. % to 40 wt. % of the granule, said skin comprising less than 20% by weight of ammonium sulfate.

DETAILED DESCRIPTION OF THE INVENTION

Figure 1:
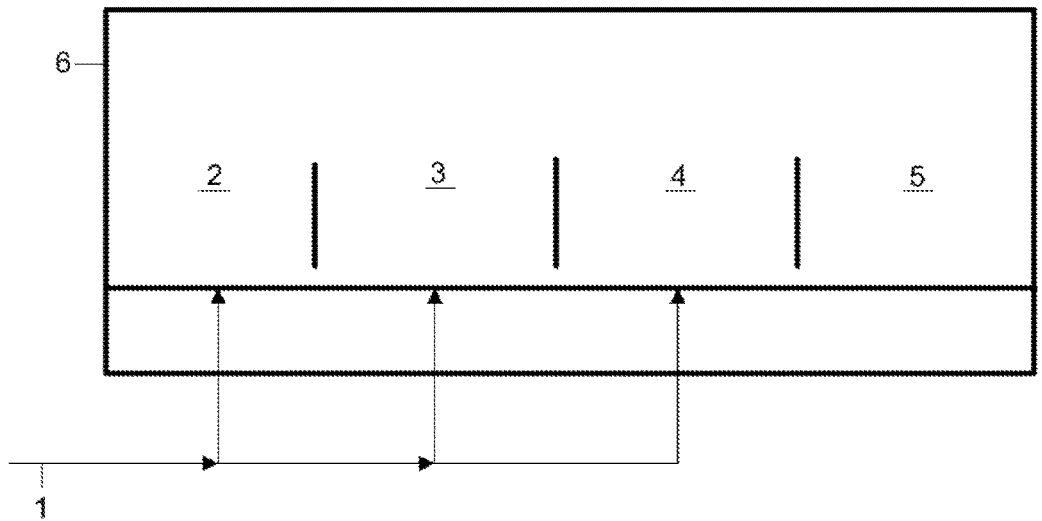
FIG. 1 is a block diagram schematically showing a conventional granulation set-up for urea products.

The invention concerns making granules of a urea product comprising urea and at least one salt, comprising an amount of the salt exceeding the solubility limit of the salt in the urea. The invention particularly pertains to a method of making granules of urea ammonium sulfate (UAS) having a higher than soluble concentration of ammonium sulfate (AS).

Without wishing to be bound by theory, the inventors believe that the generation of excess dust is related to the fact that in making such granules, one no longer can present a homogeneous liquid to the fluid bed granulator. Rather, part of the UAS is present in the form of a slurry (i.e., a suspension) comprising solid ammonium sulfate particles in a UAS melt. When this slurry is fed to the fluid bed the formed granules have an irregular surface caused by AS particles protruding from the surface. It is believed that due to this irregular surface, friction and attrition will lead to more dust being generated than during handling of smooth granulate.

The non-smooth surface of the UAS-granules may also adversely affect the flowing properties of these granules in comparison with smooth urea granules. These UAS granules will therefore have a lower flowability-index, a higher Angle of repose, lower bulk density, a higher internal friction, etc. The worsening of these properties of UAS granules can/will lead to some issues. E.g., a smaller flow rate during gravity flow from bin/bunker, etc., an increased risk of choking/blocking in gravity piping/chutes, and worse spreading properties on fertilizer spreader.

The inventors, in seeking to solve the aforementioned problem of dust generation, therefore have judiciously considered to solve the problem of making UAS granules having a high AS concentration, yet without the drawbacks of a non-smooth surface. This presents a technical challenge, since granules having a high salt content as mentioned above, are necessarily made from a slurry (a suspension), such as a UAS slurry, rather than from a homogenous liquid.

According to the invention, the feed of the slurry to the granulation process is adapted by distinguishing early stage granulation of a highly concentrated slurry, and final stage granulation of a homogenous urea liquid comprising an amount of salt below the solubility limit, or in the absence of the salt. Mixtures of salts are included in the invention.

In a broad sense, the invention is based on the judicious insight to obtain the desired high concentration in the granules by securing that an inner portion of the granulate has a relatively high proportion of the salt (such as AS or potassium chloride), whilst an outer portion of the granulate has a proportion of said salt expressly below the solubility limit of the salt in urea. It will be understood that the manner in which the problem of a non-smooth surface of highly concentrated UAS granules is solved, can also be applied to urea products having insoluble amounts of other salts, such as potassium chloride.

To this end, the granulation process of the invention comprises presenting at least two liquid streams to the granulation process. One, as a non-final liquid, is a slurry comprising urea and an amount of salt above the solubility limit of the salt in urea. In the event of AS, this means that the non-final liquid comprises, relative to its total composition, more than 20 wt. % of ammonium sulfate. The other liquid stream, as a final liquid, is a solution comprising urea, either without salt or comprising only dissolved amounts of salt. In the event of AS this means that the final granulation liquid comprises, relative to its total composition, an amount of 0-20 wt. % of ammonium sulfate. Thereby substantially all of the ammonium sulfate, if present, is dissolved in the urea. Typically, the non-final liquid is a slurry comprising undissolved AS, while the final liquid is a homogenous urea liquid comprising either no AS, or only dissolved AS. In the event of salts other than AS, the skilled person will be aware of the applicable solubility limits.

According to the invention, the final liquid, of relatively low (soluble) salt concentration, will be fed to a final step of the granulation process. The non-final liquid, of relatively high (insoluble) salt concentration, will be fed to the same granulation process prior to said final liquid.

The number of stages of the granulation process is not critical. The process just requires the availability of granulation equipment allowing a plurality of subsequent feeds of granulation liquid. Such equipment can be a system comprising a plurality of granulators in series. Preferably, the equipment is a single granulator provided with multiple feeding sections in series. Also, a combination of the aforementioned types of granulators can be used.

In addition to the aforementioned non-final and final granulation liquids, more granulation liquids can be used upstream of the aforementioned final granulation liquid. Depending on the number of possible subsequent feeds to the granulation process, a plurality of granulation liquids of high and low salt concentration can be used. It will be understood that in the event that a liquid of low (soluble) salt concentration is used also upstream of said final liquid, the amount of salt provided by one or more non-final liquids of high concentration will have to be proportionally higher, in order to secure an overall salt concentration in the granules of the desired high value of greater than the solubility limit of the salt in urea. In the event of UAS, the aforementioned salt is AS, and the applicable solubility limit is 20% by weight. This is illustrated with reference to the following, non-limiting computation examples CE1 to CE5.

CE1 Two granulation liquids are used in a ratio of 1:1, with the final liquid having 10% by weight of AS. In this example, the non-final granulation liquid will have more than 30% by weight of AS in order to end up with granules having more than 20% by weight of AS.

CE2 Two granulation liquids are used, viz. a non-final liquid (a) having 25% by weight of AS and a final liquid (b) having 15% by weight of AS. In this example, the relative proportion of the two liquids will be such that the ratio of (a):(b) is to exceed 1:1.

CE3 Three granulation liquids are used: a first non-final liquid (c) having 10% of AS, a second non-final liquid (d) having 25% of AS, and a final liquid (e) having 5% of AS. Here the proportion of the second non-final liquid will have to be a relatively high majority (such as more than about 75% by weight) of the total of the granulation liquids, in order to secure an overall percentage of more than 20% of AS in the final granulate. E.g. 1 part by weight of (c)+6 parts by weight of (d)+1 part by weight of (e). This will result in a granulate overall concentration of AS in the granulate of 20.625% by weight: $(1/8 \times 10)+(3/4 \times 25)+(1/8 \times 5)=1.25+18.75+0.625=20.625$.

CE4 Four granulation liquids are used: a first non-final liquid (f) having 40% of AS, a second non-final liquid having 30% of AS, a third non-final liquid having 20% of AS, and a final liquid having 0% of AS. If these liquids are used in equal amounts, the overall percentage of AS in the final granulate will be $1/4 \times (40+30+20+0)=22.5\%$.

CE5 Five granulation liquids are used, whereby four subsequent non-final granulation liquids all have 25% of AS, and are all used in the same proportion. In order to arrive at an overall concentration of more than 20% AS, the final granulation liquid, having less than 20% by weight of AS, will then comprise at least a minimal amount of AS, e.g., at least 1% by weight, such as at least 5% by weight, such as at least 10% by weight.

The skilled person will have no difficulty whatsoever to determine the amounts and relative proportions needed for any number and type of granulation liquid applied. Thereby the skilled person will be sufficiently guided by the required overall percentage (more than 20% of AS), and by the required percentage in the final liquid (less than 20% of AS). Also, for other salts, the skilled person will be able to adjust the amounts and relative proportions needed, taking into account the solubility limit of the salt.

In an interesting embodiment, the number of granulation liquids that are subsequently presented to the granulation process is in a range of from two to six. Preferably this number is three to four.

As in conventional urea or UAS granulation, the core of the granules is provided by seed particles onto which granulation liquid is applied. In the event if UAS, these seed particles are generally provide from powdered (typically coarse) urea or UAS granulate. Such powder can generally be obtained by suitable size reduction techniques such as crushing, grinding, milling, or other methods of pulverizing a granulate. The seeds can have a wide variety in composition. Particularly, they can originate from either or both of a part of the granule with high AS-concentration or from a part of the granule with low AS concentration. Preferably, the seed particles are provided by crushing the granulate produced according to the invention. Thereby the average AS-concentration in the seed-particles will generally be equal to the average AS-concentration in the granules produced in the fluid bed granulator. It is, however, also possible (both as initial seed particles and throughout the process) to employ pure urea particles as seeds, or pure AS-particles. The foregoing correspondingly applies to salts other than AS, or to mixtures of salts.

It will be understood that the smoothness of the granulate obtainable by the method of the invention is better secured in the event that the final granulation liquid is applied as a layer of a desirable minimum thickness. It will also be understood that this requirement for the final liquid will be less stringent if the directly preceding non-final liquid also has a percentage of salt, such as AS, of below the solubility limit. Preferably, the relative proportion of the final liquid having 0-20% by weight of ammonium sulfate is at least 3 wt. %, preferably at least 5%, and more preferably at least 10%. It is conceivable that a non-final granulation liquid having also a salt percentage below the solubility limit, such as 0-20% by weight of AS, is applied directly upstream of said final liquid (i.e., without a granulation liquid having more than 20% of AS, or the applicable insoluble concentration of another salt, applied in between said liquids). In that event, the relative proportion of both of these liquids is within the aforementioned ranges. It will also be understood, with reference to the example of AS, that the higher the proportion is of granulation liquids having up to 20% by weight of AS, the higher the concentration of AS in the other, non-final, granulation liquids needs to be. It will further be understood that the stringency of the latter requirement will depend on the value of the AS concentration in the range of from 0% to 20% by weight. Logically, a relatively high amount of a final liquid having no AS, will account for a higher percentage of AS in one or more non-final liquids, than would be the case in the event of a relatively low amount of final liquid having 20% by weight of AS. The final granulation liquid preferably comprises of from 10 wt. % to 20 wt. % of ammonium sulfate. More preferably, the final granulation liquid comprises of from 15 wt. % to 20 wt. %, and most preferably it comprises the maximum soluble amount, generally 20 wt. %.

In order to be practically processable, granulation liquids having more than 20% by weight of AS will preferably have an AS concentration up to approximately 50% by weight, preferably up to 40% by weight, and more preferably higher than 20% by weight and up to 30% by weight.

In all of the foregoing granulation liquids having more than a soluble amount of the salt, such as more than 20% by weight of AS, the urea comprising the dissolved amount of salt can be considered to be the continuous phase of the slurry. Hereby urea will generally be highly concentrated, in the sense that it is present as a urea liquid containing at most a small amount of water and dissolved salt, such as AS. Generally, the amount of water will not exceed 10%. Preferably, the urea liquid comprises at least 95% by weight of urea and biuret, and more preferably at least 98.5% by weight of urea and biuret. As to biuret, this is a regular component of urea, resulting as a by-product of urea synthesis. For the typical use of urea products such as UAS, viz., as a fertilizer, the amount of biuret is not particularly critical, although generally below 5 wt. % and preferably not exceeding 1-1.3 wt. %. Preferably the biuret content is at most 1% by weight, and for some application more preferably below 0.3% by weight.

The urea for use in the present invention can be produced in any manner. The skilled person is familiar with various processes that exist for the production of urea.

A frequently used process for the preparation of urea according to a stripping process is the carbon dioxide stripping process as for example described in Ullmann's Encyclopedia of Industrial Chemistry, Vol. A27, 1996, pp 333-350. In this process, the synthesis section is followed by one or more recovery sections. The synthesis section comprises a reactor, a stripper, a condenser and a scrubber in which the operating pressure is in between 12 and 18 MPa and preferably in between 13 and 16 MPa. In the synthesis section the urea solution leaving the urea reactor is fed to a stripper in which a large amount of non-converted ammonia and carbon dioxide is separated from the aqueous urea solution. Such a stripper can be a shell and tube heat exchanger in which the urea solution is fed to the top part at the tube side and a carbon dioxide feed to the synthesis is added to the bottom part of the stripper. At the shell side, steam is added to heat the solution. The urea solution leaves the heat exchanger at the bottom part, while the vapor phase leaves the stripper at the top part. The vapor leaving said stripper contains ammonia, carbon dioxide and a small amount of water. Said vapor is condensed in a falling film type heat exchanger or a submerged type of condenser that can be a horizontal type or a vertical type. A horizontal type submerged heat exchanger is described in Ullmann's Encyclopedia of Industrial Chemistry, Vol. A27, 1996, pp 333-350. The heat released by the exothermic carbamate condensation reaction in said condenser is usually used to produce steam that is used in a downstream urea processing section for heating and concentrating the urea solution. Since a certain liquid residence time is created in a submerged type condenser, a part of the urea reaction takes already place in said condenser. The formed solution, containing condensed ammonia, carbon dioxide, water and urea together with the non-condensed ammonia, carbon dioxide and inert vapor is sent to the reactor. In the reactor the above mentioned reaction from carbamate to urea approaches the equilibrium. The ammonia to carbon dioxide molar ratio in the urea solution leaving the reactor is generally in between 2.5 and 4 mol/mol. It is also possible that the condenser and the reactor are combined in one piece of equipment. An example of this piece of equipment as described in Ullmann's Encyclopedia of Industrial Chemistry, Vol. A27, 1996, pp 333-350. The formed urea solution leaving the urea reactor is supplied to the stripper and the inert vapor containing non-condensed ammonia and carbon dioxide is sent to a scrubbing section operating at a similar pressure as the reactor. In that scrubbing section the ammonia and carbon dioxide is scrubbed from the inert vapor. The formed carbamate solution from the downstream recovery system is used as absorbent in that scrubbing section. The urea solution leaving the stripper in this synthesis section requires a urea concentration of at least 45% by weight and preferably at least 50% by weight to be treated in one single recovery system downstream the stripper. The recovery section comprises a heater, a liquid/gas separator and a condenser. The pressure in this recovery section is between 200 to 600 kPa. In the heater of the recovery section the bulk of ammonia and carbon dioxide is separated from the urea and water phase by heating the urea solution. Usually steam is used as heating agent. The urea and water phase, contains a small amount of dissolved ammonia and carbon dioxide that leaves the recovery section and is sent to a downstream urea processing section where the urea solution is concentrated by evaporating the water from said solution.

The invention is not limited to any particular urea production process. Other processes and plants include those that are based on technology such as the HEC process developed by Urea Casale, the ACES process developed by Toyo Engineering Corporation and the process developed by Snamprogetti. All of these processes, and others, may be used preceding the urea finishing method of the invention.

Urea production generally involves a finishing step in which a urea melt is brought into the desired particulate form, generally involving any one of prilling, granulation, and pelletizing. For the production of UAS granulate according to the invention, either preformed solid urea can be remelted and subject to mixing with AS and granulation. Preferably, the mixing with AS is done with a urea melt directly obtained from a urea production plant, prior to finishing.

A preferred urea finishing method, and preferably used in the present invention for granulation of urea products such as UAS as well, is fluidized bed granulation. Therein a urea melt is sprayed on granules that grow in size as the process continues. The term "urea melt" is known in the art, and is applied to urea having less than 10% of water, such as less than 5% of water and preferably up to 1.5% of water (and generally including biuret, as mentioned above). The concentration of urea takes usually place at high temperatures and sub-atmospheric pressures. Usually concentration of the urea solution to the desired moisture content in the anhydrous urea melt takes place in a concentration section comprising one or a sequence of one or more concentrators in series.

The urea melt leaving the concentration section is usually conveyed by a pump to the urea finishing section. The urea finishing sections usually used in urea plants for producing the urea end product are urea granulation finishing and urea prilling finishing. For urea granulation finishing the desired urea concentration in the urea melt to the granulator is in between 95 and 99% by weight. The urea melt sent to the finishing section comprises urea, including biuret, water and small amounts of ammonia. The ammonia concentration in the urea melt sent to said urea finishing section amounts in between 100 and 900 ppm by weight.

Granulation is preferably conducted in a fluidized bed granulator. Such granulator typically comprises an inlet for seed particles, an outlet for granule products, a perforated bottom plate for distributing fluidizing air, and a gas outlet. In order to accommodate the process of the invention, a preferred granulator further comprises a plurality of compartments configured between said inlet for seed particles and outlet for granule products. Each compartment contains at least one or a plurality of nozzles for feeding a slurry or a melt of urea, UAS, or another applicable urea product granulation liquid. Different types of nozzles can be employed. Particularly, one type generates droplets, another type serves to feed the slurry or the melt to the fluidized bed in the form of a film. The granulator is configured to move the particles from the inlet to the outlet whereby the particle size increases from the inlet to the outlet. In the process of the invention, the first feed stream, i.e., nearest to the inlet, will generally be a slurry. The last stream, i.e., nearest to the outlet, will be a homogeneous liquid.

In carrying out the method of the invention, hereby illustrated with reference to UAS, the first compartment closest to the inlet (i.e., the first upstream compartment) will generally be fed with a slurry stream of UAS. This slurry has a concentration of AS greater than 20 wt. %, preferably greater than 22 wt. %, and most preferably greater than 25 wt. %. The last compartment (downstream) is fed with a final granulation liquid as mentioned above, i.e., with a melt stream of urea or UAS, with a concentration AS less than 20 wt. %, such as less than 15 wt. % optionally a melt of urea without AS. Preferably, the AS concentration in all granulation liquids is the same as in the continuous phase of the slurry. Preferably, the granulator comprises a plurality of compartments upstream of the final granulation compartment. This accommodates feeding to the granulation process a corresponding plurality of non-final granulation liquids as discussed above. It will be understood that, downstream of the final granulation compartment, a granulator used in the invention may comprise one or more additional compartments, not used for feeding granulation liquid. This typically includes a cooling compartment.

The ammonium sulfate (AS) can be from any source. In an interesting embodiment, the AS is formed by neutralizing ammonia obtained from urea finishing. In this respect, reference is made to US 2013/0319060. Another background reference on neutralizing NH3 off-gas with sulfuric acid, followed by UAS formation, is US 2012/0240649. In another interesting embodiment, which is beneficial from an economical point of view, the AS is provided as a by-product or another process, such as from the production of caprolactam or from the desulfurization of coal.

In conventional urea granulation processes, the off-gases and condensates from the urea-evaporation section are transported to further processing steps (in the urea melt-plant), and need to be treated/reworked at great effort, and with a relatively high energy consumption. In connection with the present invention, the off-gases and condensates from the UAS-evaporation section containing a high amount of NH3 are preferably transported to a dust- and NH3-washing section. There the NH3 is simply neutralized so as to form AS, i.e., converted by reaction with sulfuric acid to ammonium sulfate.

It will be understood that, in the context of the invention's purpose to produce UAS, the choice to produce AS from ammonia obtained (such as by washing) from the evaporation-section is a very efficient use of the off-gases and condensates from the evaporation. This reduces the amount of AS that has to be added separately.

Any suitable type of fluidized bed granulator and fluidized bed granulation process can be used. As is known in the art, the granulation liquid can be applied in various ways. Generally, this liquid will be provided in the form of atomized droplets, or as a sprayed film. See, e.g., Ullmann's Encyclopedia of Industrial Chemistry, Urea by Jozef H. Meessen, Stamicarbon, Sittard, the Netherlands. It will be understood that the granulation fluids are provided at a sufficiently high temperature to be actually in a liquid state. As is known in the art, for urea granulation the temperature of the granulation liquid is in a range of 132-140° C. Since presence of ammonium sulfate reduces the crystallization temperature of the granulation liquid, typical temperatures for UAS granulation of the granulation liquid are in a range of 118-140° C. For other salts, the skilled person will be able to adjust the temperatures as necessary.

The invention also pertains to a urea ammonium sulfate granulate obtainable by the method identified above, in all of its embodiments. The granulate of the invention comprises granules having more than 20% by weight of ammonium sulfate, and having a skin comprising less than 20% by weight of ammonium sulfate. Said skin corresponds to a weight fraction of from 3 wt. % to 40 wt. % of the granule, preferably of from 5 wt. % to 20 wt. %. It will be understood that the term "skin" here does not necessarily refer to a single applied layer, but can also comprise a plurality of subsequently applied layers.

The invention is further illustrated with reference to the Example and the drawings. It will be understood that the example and drawing are not limiting the invention. E.g., the invention is not limited to the specific types of equipment and specific plant systems as shown. All figures show schematic drawings of equipment parts and process streams relating to embodiments of the invention.

In FIG. 1 a block diagram is presented that schematically shows a conventional granulation set-up for urea products, such as UAS. The following process streams and granulator equipment parts are shown:
- 1—Feed stream of granulation liquid (UAS melt or suspension);
- 2—First granulation compartment of a fluidized bed granulator;
- 3—Second granulation compartment of fluidized bed granulator;
- 4—Third (and final) granulation compartment of a fluid bed granulator;
- 5—(optional) Cooling compartment of a fluidized bed granulator;
- 6—Fluidized bed granulator;

As shown, a feed stream of granulation liquid is fed to the three granulation compartment, resulting in granules built-up, at each subsequent granulation stage, of the same granulation liquid, such as a UAS slurry.

Figure 2:
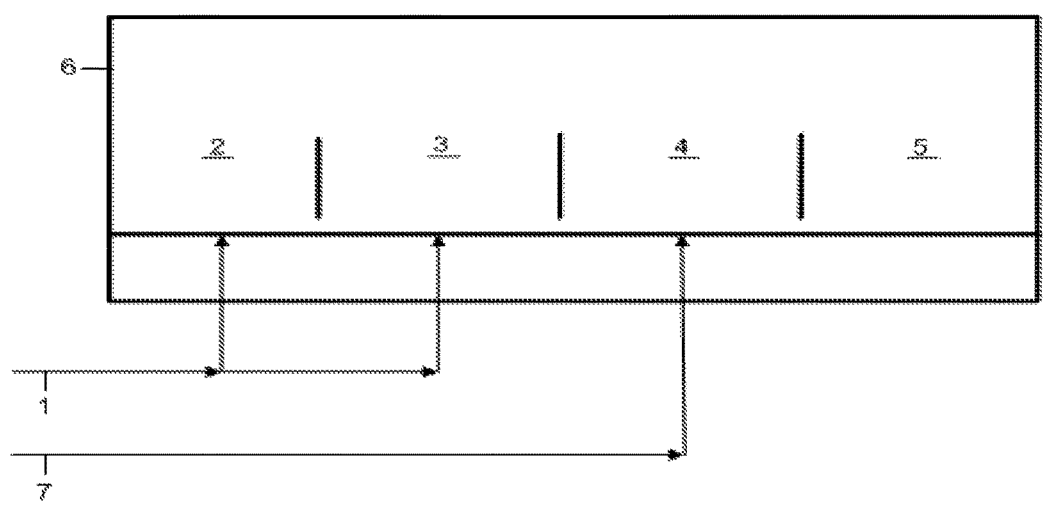
FIG. 2 is a block diagram schematically showing a granulation set-up for urea products in accordance with an embodiment of the invention.

FIG. 2 is a block diagram schematically showing a granulation set-up for urea products in accordance with an embodiment of the invention. Herein the same process streams and equipment parts are shown as in FIG. 1. However, the feed stream (1) of granulation liquid is fed only, as a non-final granulation liquid, to the non-final granulation compartments (2) and (3). A feed stream (8) of a final granulation liquid, typically urea or urea with only dissolved salt such as AS, is fed to the final granulation compartment (4).

EXAMPLE

Reference is made to FIG. 2. In Table 1 below, the composition of the feed streams to the granulator's non-final and final granulation compartments in an exemplified embodiment of the invention is given.

TABLE 1

| Component | Wt. % in non-final feed | Wt. % in final feed |
| --- | --- | --- |
| Urea | 42.8 | 85.7 |
| AS liquid | 10.7 | 12 |
| AS solid | 44.6 | — |
| Formaldehyde | 0.3 | 0.045 |
| Biuret | 0.5 | 0.7 |
| Ammonia | 0.05 | 0.055 |
| Water | 1.05 | 1.5 |

While the invention has been illustrated and described in detail in the drawing and foregoing description, such illustration and description are to be considered illustrative or exemplary and not restrictive; the invention is not limited to the disclosed embodiments.

For example, it is possible to operate the invention in an embodiment wherein another component is added to the granules via one or more of the feed streams. This refers to, e.g., formaldehyde as well as other granulation additives and/or adjuvants, as well as to sulfur and/or other micronutrients.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain features of the invention are recited in mutually different dependent claims does not indicate that a combination of these features cannot be used to advantage.

In sum, the invention includes a method of making a granulate of a urea product comprising urea and a salt, such as urea ammonium sulfate, having a high content of the salt. The high content is such as to provide an amount of the salt above the limit of solubility of the salt in urea. The granulate of the invention is characterized by having a smooth surface, which, e.g. in the event of urea ammonium sulfate, is not normally the case for granulate having the aforementioned high ammonium sulfate content. According to the invention this is realized by dividing the feed liquids to granulation. This division is based on non-final granulation liquids of a sufficiently high content of the salt, and a final granulation liquid (determining the surface) having a salt content of below the solubility limit of the salt, or no salt at all. E.g. in the event of urea ammonium sulfate, the non-final granulation liquids possibly are a slurry of urea and more than 20 wt. % of ammonium sulfate. The final granulation liquid then has 0-20 wt. % of ammonium sulfate, i.e. below the solubility limit.

The invention claimed is:

1. A method to produce granules of urea/ammonium sulfate wherein said granules comprise more than 20 wt. % of ammonium sulfate, the method comprising
    (a) providing a slurry comprising urea wherein said slurry comprises more than 20 wt. % of ammonium sulfate relative to the total composition of the slurry;
    (b) subjecting said slurry to a fluidized bed granulation process, thereby forming a urea/ammonium sulfate granulate intermediate;
    (c) providing a liquid comprising urea wherein said liquid comprises 0-20 wt. % of ammonium sulfate relative to the total composition of the liquid, said ammonium sulfate being dissolved in the urea in the liquid;
    (d) feeding said liquid of (c) as a final granulation liquid to the urea/ammonium sulfate granulate intermediate to form urea/ammonium sulfate granules wherein said liquid is fed in an amount that results in urea/ammonium sulfate granules comprising more than 20 wt. % of ammonium sulfate.

2. The method of claim 1, which further comprises subjecting at least a part of said urea/ammonium sulfate granules obtained in (d) to a size-reduction technique to produce particles and feeding said particles to the fluidized bed granulation process as seeds.

3. The method of claim 1, comprising presenting of from two to six subsequent granulation liquids to the granulation process.

4. The method of claim 3, wherein the number of granulation liquids is three to four.

5. The method of claim 1, wherein the final granulation liquid comprises from 10 wt. % to 20 wt. % of ammonium sulfate relative to the total composition of the liquid.

6. The method of claim 1, wherein the slurry comprises up to 40% by weight of ammonium sulfate relative to the total composition of the slurry.

7. The method of claim 2, wherein said size reduction process comprises crushing, grinding or milling.

8. The method of claim 5, wherein the final granulation liquid comprises from 15 wt. % to 20 wt. % of ammonium sulfate relative to the total composition of the liquid.

9. The method of claim 6, wherein the slurry comprises ammonium sulfate higher than 20% by weight and up to 30% by weight of ammonium sulfate relative to the total composition of the slurry.

10. The method of claim 1, wherein said liquid of (c) is a homogenous urea liquid comprising no ammonium sulfate.

11. A urea/ammonium sulfate granulate comprising granules having more than 20% by weight of ammonium sulfate, and having a skin corresponding to a weight fraction of from 3 wt. % to 40 wt. % of the granule, said skin comprising less than 20% by weight of ammonium sulfate.

12. A granulate according to claim 11, wherein the skin corresponds to a weight fraction of from 5 wt. % to 20 wt. % of the granule.

13. A granulate according to claim 11, wherein the skin is provided as a granulated layer from a single compartment of a granulator.

* * * * *